(12) United States Patent
Gates et al.

(10) Patent No.: US 9,863,090 B2
(45) Date of Patent: Jan. 9, 2018

(54) PROCESS OPERATIONS FOR BIOMASS FRACTIONATION

(71) Applicant: Bio-Sep Limited, Buckinghamshire (GB)

(72) Inventors: Malcolm Gilbert Gates, Buckinghamshire (GB); Anthony Robin McGarel-Groves, Buckinghamshire (GB); Nigel Donald Anderson, Buckinghamshire (GB); Kenneth John Coryton Day, Buckinghamshire (GB); Patrick Leahy, Buckinghamshire (GB); Geoffrey Nicholas Drage, Buckinghamshire (GB)

(73) Assignee: BIO-SEP LIMITED, Buckinghamshire (GB)

( * ) Notice: Subject to any disclaimer, the term of this patent is extended or adjusted under 35 U.S.C. 154(b) by 0 days.

(21) Appl. No.: 14/770,286

(22) PCT Filed: Feb. 26, 2014

(86) PCT No.: PCT/GB2014/050576
§ 371 (c)(1),
(2) Date: Aug. 25, 2015

(87) PCT Pub. No.: WO2014/132056
PCT Pub. Date: Sep. 4, 2014

(65) Prior Publication Data
US 2016/0002851 A1    Jan. 7, 2016

(30) Foreign Application Priority Data
Feb. 27, 2013   (GB) .................................. 1303521.7

(51) Int. Cl.
*D21C 11/00*    (2006.01)
*D21C 1/00*    (2006.01)
(Continued)

(52) U.S. Cl.
CPC ............ *D21C 11/0007* (2013.01); *C07G 1/00* (2013.01); *C08B 37/006* (2013.01); *C08H 6/00* (2013.01);
(Continued)

(58) Field of Classification Search
CPC ........ D21C 11/0007; D21C 1/00; D21C 1/04; D21C 1/10; D21C 3/00; D21C 5/00;
(Continued)

(56) References Cited

U.S. PATENT DOCUMENTS 4,594,130 A    6/1986   Chang et al.
4,746,401 A *  5/1988   Roberts .................. D21C 3/222
                                                    162/72
(Continued)

FOREIGN PATENT DOCUMENTS

EP    2006354 A2    12/2008
EP    2489780 A1    8/2012
(Continued)

OTHER PUBLICATIONS

Zhao, Xuebing, Keke Cheng, and Dehua Liu. "Organosolv pretreatment of lignocellulosic biomass for enzymatic hydrolysis." Applied microbiology and biotechnology 82.5 (2009): 815-827.*
(Continued)

*Primary Examiner* — Nicholas Hill
(74) *Attorney, Agent, or Firm* — K&L Gates LLP

(57) ABSTRACT

There is described a method of fractionating a biomass material comprising: (i) blending the biomass material with an acid catalyst to form a slurry; (ii) mixing the slurry with an organosolv reagent optionally under an inert atmosphere to form a pre-treatment mix; (iii) subjecting the pre-treatment mix to sonication; (iv) optionally heating the product of step (iii) in an autoclave under pressure; (v) separating the solid and liquid components of the fractionation mix; (vi)
(Continued)

Overall process concept optionally washing the solid; (vii) optionally drying the solid component; (viii) separating the liquid component into organic and aqueous components; and (ix) isolating lignin from the organic component and/or isolating hemi-cellulose from the aqueous component.

20 Claims, 10 Drawing Sheets

(51) Int. Cl.
*D21C 3/00* (2006.01)
*D21C 5/00* (2006.01)
*C08H 7/00* (2011.01)
*C08H 8/00* (2010.01)
*C07G 1/00* (2011.01)
*C08B 37/00* (2006.01)
*D21C 1/04* (2006.01)
*D21C 1/10* (2006.01)

(52) U.S. Cl.
CPC .................. *C08H 8/00* (2013.01); *D21C 1/00* (2013.01); *D21C 1/04* (2013.01); *D21C 1/10* (2013.01); *D21C 3/00* (2013.01); *D21C 5/00* (2013.01); *Y02P 70/24* (2015.11)

(58) Field of Classification Search
CPC .... C07G 1/00; C08H 6/00; C08H 8/00; C08B 37/006
See application file for complete search history.

(56) References Cited

U.S. PATENT DOCUMENTS

| | | | |
|---|---|---|---|
| 5,730,837 A * | 3/1998 | Black | D21C 3/20 127/37 |
| 2005/0136520 A1* | 6/2005 | Kinley | C12M 21/12 435/155 |
| 2010/0159516 A1 | 6/2010 | Diner et al. | |
| 2016/0002850 A1* | 1/2016 | Gates | D21C 1/04 530/507 |

FOREIGN PATENT DOCUMENTS

| | | | | |
|---|---|---|---|---|
| GB | WO 2010058185 A1 * | 5/2010 | ......... | C08B 37/0003 |
| WO | 79/00119 | 3/1979 | | |
| WO | 2000/35579 A1 | 6/2000 | | |
| WO | 2003/101577 A1 | 12/2003 | | |
| WO | 2009/018469 A1 | 2/2009 | | |
| WO | 2010/058185 A1 | 5/2010 | | |

OTHER PUBLICATIONS

Bozell, Joseph J., et al. "Solvent fractionation of renewable woody feedstocks: Organosolv generation of biorefinery process streams for the production of biobased chemicals." biomass and bioenergy 35.10 (2011): 4197-4208.*

W. Toman, et al., "Protective Gases," Ullmann's Encyclopedia of Industrial Chemistry, vol. 30, 365-378, published online 2000.*

Bozell, Joseph J. et al., "Solvent fractionation of renewable woody feedstocks: Organoslov generation of biorefinery process streams for the production of biobased chemicals", Biomass and Bioenergy, vol. 35, (2011), pp. 4197-4208.

* cited by examiner

Overall process concept

Proposed flowsheet routes indicating the use of a full sonication (option 1) or part autoclave (option 2).

Sonication only process flowsheet

Note: The values included are on an input of 100g biomass with fractions taken from table 2 and 3.

Sonication and autoclave process flowsheet

Cumulative fractionation of each stage for each feed stock type

Cumulative fractionation of each stage for oak with oxalic acid compared to an equivalent experiment with sulphuric acid (SA).

HPLC refractive index chromatograms of aqueous fractions for all feedstocks against a reference hemi-cellulose sample SEC chromatograms of organic (a) light and (b) heavy fractions HPLC refractive index chromatograms of aqueous fractions for all feedstocks against a reference hemi-cellulose sample HPLC refractive index chromatograms of aqueous fractions

PROCESS OPERATIONS FOR BIOMASS FRACTIONATION

CROSS REFERENCE TO RELATED APPLICATIONS

This is the national phase under 35 U.S.C. §371 of International Application No. PCT/GB2014/050576, filed on Feb. 26, 2014, which claims priority to and the benefit of United Kingdom Patent Application No. 1303521.7, filed on Feb. 27, 2013, the entire disclosures of each of which are incorporated by reference herein.

FIELD OF THE INVENTION

The present invention relates to novel processes for the treatment of biomass materials.

In particular the invention relates to processes for the fractionation of various lignocellulosic feedstocks to their base components, i.e. cellulose, hemi-celluloses and lignin using sonication and optionally an autoclave.

BACKGROUND OF THE INVENTION

Most plant biomass materials, such as wood, are referred to as lignocellulosic material and comprise three main components, namely, cellulose, hemi-cellulose and lignin.
  Cellulose: is a polysaccharide consisting of a linear chain of $\beta(1\rightarrow4)$ linked D-glucose units and will usually comprise 7,000 to 15,000 glucose molecules.
  Hemi cellulose: is a polysaccharide related to cellulose but is derived from several sugars including glucose, xylose, mannose, galactose, rhamnose and arabinose and consists of shorter chains of around 200 sugar units.
  Lignin is: a cross-linked macromolecule with molecular masses in excess of 10,000 and is relatively hydrophobic and aromatic in nature. Lignin is rich in the phenylpropanoids, such asp-coumaryl alcohol, coniferyl alcohol and sinapyl alcohol.

More recently, our co-pending International patent application PCT/GB2009/002731 describes a method of processing biomass which comprises the digestion of biomass material in an acidic aqueous medium, subjected to ultrasonic waves and separating the biomass into its constituents of lignin, hemi-cellulose and cellulose.

We have now found a new processing system which is advantageous in the treatment of biomass material and the fractionation of the biomass into its constituent parts of lignin, hemi-celluloses and cellulose.

SUMMARY OF THE INVENTION

The overall method of processing biomass according to the present invention is illustrated in FIG. 1. A biomass feed is added to dilute aqueous acid in the presence of an organosolv reagent and the biomass is at least partially hydrolysed in a blending stage. The mixture is preferably de-aerated. This de-aerated mixture is then sonicated in a pre-treatment stage and passed to the autoclave or secondary sonication for digestion. Following digestion, the mixture is fractionated with the addition of water releasing the liquid components of the hemi-cellulose (e.g. sugars) and lignin (e.g. alcohols). The subsequent separation stage separates and isolates these components.

Therefore, according to a first aspect of the invention there is provided a method of fractionating a biomass material comprising the steps of:
  (i) blending the biomass material with an acid catalyst to form a slurry (stage 1);
  (ii) mixing the slurry (stage 1) with an organosolv reagent, optionally under an inert atmosphere to form a pre-treatment mix (stage 2);
  (iii) subjecting the pre-treatment mix (stage 2) to sonication and, optionally, heat (stage 3);
  (iv) optionally heating stage 3 in an autoclave under pressure; (stage 3a);
  (v) separating the solid (stage 4a) and liquid (stage 4b) components of the fractionation mix of stage 3 or stage 3a;
  (vi) optionally washing the solid (stage 4a);
  (vii) optionally drying the solid component (stage 4a) (to retrieve cellulosic materials);
  (viii) separating the liquid component (stage 4b) into organic (stage 5a) and aqueous (stage 5b) components; and
  (ix) isolating lignin from the organic component (stage 5a) and/or isolating hemi-cellulose from the aqueous component (stage 5b).

The method of this aspect of the invention is illustrated in the flow sheet of FIG. 2.

Optionally, steps (i) and (ii) may be combined into a single blending stage comprising mixing the biomass material with an acid catalyst and an organosolv reagent, optionally under an inert atmosphere.

In one embodiment of the present invention the method of fractionating a biomass material comprises the steps of:
  (i) blending the biomass material with an acid catalyst to form a slurry (stage 1);
  (ii) mixing the slurry (stage 1) with a de-aerated organosolv reagent under an inert atmosphere to form a pre-treatment mix (stage 2);
  (iii) subjecting the de-aerated pre-treatment mix (stage 2) to sonication and, optionally, heat (stage 3);
  (iv) subjecting the sonicated mixture to thermal or ultrasonic digestion, e.g. pressure and heat and separating the solid (stage 4a) and liquid (stage 4b) components of the digestion mix by fractionation of stage 3 or stage 3a;
  (v) optionally washing the solid (stage 4a);
  (vi) optionally drying the solid component (stage 4a) (to retrieve cellulosic materials);
  (vii) fractionating the liquid component (stage 4b) into organic (stage 5a) and aqueous (stage 5b) components; and
  (viii) isolating lignin from the organic component (stage 5a) and/or isolating hemi-cellulose from the aqueous component (stage 5b).

The method of this aspect of the invention is illustrated in the flow sheet of FIG. 3.

Optionally, steps (i) and (ii) may be combined into a single blending stage comprising mixing the biomass material with an acid catalyst and an organosolv reagent, optionally under an inert atmosphere.

In another embodiment of the present invention the method of fractionating a biomass material comprises the steps of:
  (i) blending the biomass material with an acid catalyst to form a slurry (stage 1);
  (ii) mixing the slurry (stage 1) with an organosolv reagent to form a pre-treatment mix (stage 2);

(iii) subjecting the pre-treatment mix (stage 2) to sonication and, optionally, heat (stage 3);
(iv) digesting stage 3 in an autoclave under pressure; (stage 3a)
(v) separating the solid (stage 4a) and liquid (stage 4b) components of the fractionation mix of stage 3 or stage 3a;
(vi) optionally drying the solid component (stage 4a) (to retrieve cellulosic materials);
(vii) separating the liquid component (stage 4b) into organic (stage 5a) and aqueous (stage 5b) components; and
(viii) isolating lignin from the organic component (stage 5a) and/or isolating hemi-cellulose from the aqueous component (stage 5b).

The method of this aspect of the invention is illustrated in the flow sheet of FIG. 4.

Optionally, steps (i) and (ii) may be combined into a single blending stage comprising mixing the biomass material with an acid catalyst and an organosolv reagent, optionally under an inert atmosphere.

The step of separating the solid (stage 4a) and liquid (stage 4b) components of the fractionation mix may comprise filtering and/or pressing the fractionation mix of stage 3 or stage 3a to produce a filtrate and residual pulp.

The blending step (stage 1) is important in conditioning the biomass material with an acid. The objective is to alter the structure of the biomass in order to make the cellulose and hemi-cellulose components more accessible. Hydrolysis of biomass material without an acid treatment results in sugar yields of typically less than 20%, whereas >90% can be achieved with prior acid treatment. The level of fractionation may not be hindered by the parameters related to the mechanical intensity applied to the process but due to the poor accessibility of solvents to the centre of biomass particles, especially woody particles, by the lack of acid digestibility.

A variety of acids may suitably be used in the process of the present invention including inorganic and organic acids with varying strengths of acidity. Thus, for example, the acid may have a low pH and may include conventionally known acids, for example, a mineral acid, such as sulphuric acid, phosphoric acid or nitric acid. Alternatively, the acid may comprise an organic acid, such as an aliphatic carboxylic acid, an aliphatic dicarboxylic acid an aminocarboxylic acid or an aminodicarboxylic acid. When an organic acid is used in the process of the invention it may generally have a pKa of less than 5, e.g. from 2 to 5. In the case of a dicarboxylic acid, and especially a dicarboxylic amino acid where the carboxylic acid moieties within the molecule may have different pKa values, at least one of the carboxylic acid moieties should desirably have a pKa of less than 5. Thus, for example, an aliphatic carboxylic acid or an aliphatic dicarboxylic acid may contain 1 to 6 carbon atoms in the molecule, preferably 1 to 4 carbon atoms. Examples of organic carboxylic acids include, but shall not be limited to, acetic acid and formic acid. Such acids are recognised as being weak acids. Alternatively, the acid may be a dicarboxylic acid. A preferred acid is oxalic acid, as is disclosed in our co-pending patent application.

The use of an acid may have a corrosive effect, therefore, whilst a variety of materials may be utilized in the vessels for the blending/digestion of the biomass material, a preferred vessel material is a highly corrosion resistant material, such as a super alloy material. A preferred material is a Hastelloy® material. Hastelloy® materials are available as a variety of corrosion resistant alloys available in the UK from Haynes International, Ltd, Openshaw, Manchester. Furthermore, one of the benefits of using oxalic acid is that it has low corrosive effects.

Prior to blending the biomass material is desirably mechanically reduced (comminuted) to a mean particle size of from about 0.5 to about 10 mm diameter; from about 0.5 to about 5 mm; from about 0.5 to about 4 mm; from about 0.5 to about 3 mm; from about 1 to about 3 mm; from about 1 to about 2 mm.

A variety of comminution techniques may be used and may vary depending upon, inter alia, the nature of the biomass material. Thus, the comminution may comprise, crushing, grinding, milling chopping, shredding, etc.

Comminution is desirable since it increases the surface area in the biomass material particles thereby increasing the area of the solid-liquid interface. In most reactions involving solid particles, reaction rates are directly proportional to the area of contact with a second phase. In addition, to the surface reaction, in hydrothermal pre-treatment methods, internal reactions usually take place. During the course of internal reaction, solvent, e.g. water, penetrates into the particles. Consequently, size reduction by comminution of the biomass feedstock may increase the rate of surface and internal reactions.

The mechanically reduced biomass material may also be dried to reduce the moisture content. Drying the biomass material may also be advantageous in that it enables an accurate dry weight of biomass entering the system to be determined. Size distribution and moisture content may affect the flow behaviour of the biomass material. Drying the biomass can be very important in getting the protons (H+ ions) to many areas of the material.

However, it will be understood by the person skilled in the art that drying of the biomass material may be desirable and may increase the energy efficiency of the process.

Drying the material to <5% then rehydrating with dilute aqueous acid, e.g. oxalic acid, enables the catalytic action of the H+ ions to maximise its operation. Furthermore, it is important to highlight the benefit of de-aeration of the system e.g. with an inert gas such as nitrogen, to enhance unencumbered hydrolysis.

During the sonication pre-treatment stage, the mix may optionally be agitated in order to aid the digestion of the biomass. The spatial arrangement of the sonicator transducers will need to be so arranged to maximise the mechanical effect of this operation, which in turn renders the biomass better prepared for further intensive mechanical treatment in the digester.

Such a sonicator arrangement is novel per se. Therefore, according to a yet further aspect of the invention there is provided a sonicator system, e.g. for the treatment of biomass, said system comprising a three-dimensional arrangement of a plurality of sonicators. The three-dimensional arrangement may also aid pre-treatment of a biomass material.

The step of digestion of the biomass material, following the pre-treatment of the biomass with an acidified organsolv component as hereinbefore described, will generally include an autoclave stage or an alternative second sonicator stage.

The organosolv reagent may be mixed with the biomass in the presence of an acid catalyst. The mixture may then be subjected to de-aeration using an inert gas such as nitrogen prior to sonication. Alternatively, the biomass material may be mixed with an acid catalyst to form a slurry (stage 1) and the organosolv reagent may be mixed with the slurry.

The sonication system may be at ambient pressure, i.e. atmospheric pressure (about 1 bar), or it may be at elevated pressure, e.g. from about >1 bar to about 10 bar, from about >1 bar to about 9 bar, from about 2 bar to about 8 bar, from about 3 bar to about 7 bar, from about 4 bar to about 6 bar, e.g. about 5 bar. Preferably, sonication is not carried out at >6 bar.

The activation time for the sonicator may be varied, depending upon, inter alia, the nature of the biomass, etc.

The ultrasound as a power source may be in the range of from 2 to 10 MHz, for the purposes of the present invention the ultrasound used will generally have a frequency in the range of from about 10 to about 250 kHz, alternatively, from about 20 to about 100 kHz. The process liquor or slurry is subject to the operating vicinity of the ultrasonic probe if used, or of an ultrasonic energy transducer, such as a wrap-around ultrasonic energy transducer assembly, if such a configuration is employed. A suitable example of such a device, known in industry and commercially as the Prosonitron™, is documented in WO 00/35579. The ultrasonic energy may be applied continuously or in a discontinuous manner, such as by pulsed application. Any suitable source of ultrasonic irradiation may be used. An ultrasonic probe may, for example, be inserted into a mixing vessel, such as a continuous ultrasonic flow cell, an ultrasonic emitter may be contained in the mixing vessel, or the mixing vessel may be housed in an ultrasonic bath or it may have an ultrasound transducer fixed to the external walls of the mixing vessel. The amplitude and frequency of the ultrasound waves affects the rate of nucleation and crystal growth. The frequency of the ultrasound waves may for example be from about 16 kHz to about 1 MHz, preferably from 10-500 kHz, more preferably from 10-100 kHz such as at 10, at 20, 40, 60, 80, or 100 kHz or at any frequency therebetween, such as, about 30 kHz or about 50 kHz.

The ultrasonic irradiation is employed at an amplitude or power density that is appropriate for the production of material for a pre-determined application. For laboratory probe systems with an emitting face of, for example 80 $cm^2$, the amplitude selected may be from about 1-30 µm, typically from 3-20 µm, preferably from 5-10 µm, for example, 6 µm. Probes having a probe face surface area of 8 $cm^2$ and a power requirement of from 5-80 W, provide a power density of from about 0.6-12.5 W/$cm^2$ using amplitude of 2-15 µm. In larger systems, preferably such as those embodied in WO 03/101577, comprising transducers bonded onto the flow cell, for example a 6 litre flow cell, the power density for the transducers employed may be from 10-100 W/L, preferably from 30-80 W/L, and more preferably from 50-75 W/L, for example 60 W/L or 70 W/L. The present invention is particularly suitable for industrial scale production. In the present invention it is especially desirable to use transducers bonded onto a flow cell.

The ultrasound source may vary depending, inter alia, upon the nature of the biomass, but we have found that an ultrasound source with an energy output of from about 50 to about 400 W is desirable, e.g. about 50 to about 300 W or about 50 to about 200 W or about 75 to about 125 W, e.g. about 100 W.

These operational parameters are designed to excite the rarefaction cycle (compression/decompression) and may exceed the attractive forces of the molecules of the liquid to form cavitations. It is these cavitations which, when collapsed in succeeding compression cycles, may generate energy for chemical and mechanical effects. The phenomenon of cavitation is induced throughout the bulk medium at ultrasonic frequencies of around 20 kHz and it is estimated that a cavitation bubble may act as a localised 'hotspot' generating localised temperatures of around 3,727° C.
(4000K) and pressures in excess of 1,000 bar (100 MPa). The resultant ultrasonic waves keep the slurry agitated whilst providing further energy into the system, for example, in the form of heat.

Once the process is complete, the slurry may be subjected to a solid-liquid separation. At this point (stage 2), approximately 80% of the original input of biomass may still be retained in solid form with 20% of the original input mass dissolved into the organosolv liquor. This is exemplified in FIG. 5 which illustrates the results of a pre-treatment (sonication 1) and a digestion (sonication 2) as opposed to pre-treatment and autoclave.

The cumulative fractionation of each stage for each feed stock type is illustrated in FIG. 5.

Therefore, preferably, any separated solid is washed with organosolv reagent prior to the second sonication step or the autoclave step.

In a particular embodiment of the present invention the slurry may be agitated to mitigate gravitational settling effects otherwise mixing may reduce the effectiveness of sonication. Such agitation may, for example, comprise stirring, although it will be understood that sonication itself may provide a source of agitation. Alternatively, the slurry may be gravitationally moved.

It is good practice to wash the filtered solid with fresh organosolv liquor to release any loosely bound hemi-celluloses and lignin to the solvent. To make the wash an effective processing step, we add a 10:1 volume to mass ratio of organosolv liquor to filtered solid, i.e. 1 L of organosolv liquor to the original 100 g input of biomass.

After the sonication stage (stage 3) is complete it may be desirable to introduce a washing step (stage 3). The washing step may be undertaken at elevated temperature, e.g. in a heated, agitated, e.g. stirred, tank. For example, the washing step may be undertaken at 70° C. for 15 mins, although it will be understood that the processing parameters may be varied.

The residence time in the sonicator and/or autoclave may vary depending upon, inter alia, the nature of the biomass, etc.

However, it will be understood that sonication is really only effective during cavitation and therefore other operational parameters may suitable be used.

After a "wash stage" hereinafter described, the sonication step may be repeated. It will be understood that a repeat sonication may be conducted more than once, but lignin and hemi-cellulose returns may diminish. In the preferred aspect of the invention the sonication may be repeated only once.

The autoclave step may be carried out at a pressure of from about >5 bar to about 20 bar; or from about >5 bar to about 15 bar; or from about >5 bar to about 10 bar; or from about >5 bar to about 9 bar; or from about >5 bar to about 8 bar; or from about >5 bar to about 7 bar; e.g. about 6 bar.

In this embodiment of the present invention the process sequence resembles that of the first embodiment described herein with the following exceptions:

The '$1^{st}$ reaction stage (sonicator)"_wash stage_"$2^{nd}$ reaction stage (sonicator)"

is replaced with

"$1^{st}$ reaction stage (sonicator)"_"$2^{nd}$ reaction stage (autoclave)"_wash stage as seen in FIG. 4.

As hereinbefore described the use of a sonicator may be successful in fractionating the biomass. In this embodiment of the invention the sonicator is used as a pre-treatment step, e.g. for a short period of time to induce the fractionation of the biomass. Such a pre-treatment may be advantageous in that it may reduce the running time of the autoclave.

With a sonication step prior to the autoclave, there may be a slight reduction in the amount of hemi-celluloses extracted with a drastic improvement for lignin (see Table 1).

TABLE 1

Output material compositions of initial autoclave studies

| | Overall composition [wt. %] | |
|---|---|---|
| Output material | Autoclave | Sonicator/Autoclave |
| Pulp (cellulose) | 56.81 | 47.28 |
| Aqueous (hemi-cellulose) | 23.80 | 27.21 |
| Organic | 19.39 | 25.51 |

Possible conditions for the sonicator/autoclave process are illustrated in Table 2.

TABLE 2

Operational parameters (per 100 g of biomass)

| Stage | Equipment | Residence time [mins] | Power [W] | Temperature [° C.] | Pressure [bar] |
|---|---|---|---|---|---|
| Blending | Blender | 10 | 170 | 70 | atm. |
| 1st reaction | Heated stirred tank | 15 | 503 | 70 | atm. |
| | Ultrasound reactor | 5 | 500 | 120-140 | 5 |
| 2nd reaction | Autoclave | 60 | 501 | 140 | 5-6 |
| Wash | Heated stirred tank | 15 | 503 | 70 | atm. |

It is within the scope of the present invention for the fractionation step to include first and second sonication steps followed by an autoclave step. Therefore, according to a yet further aspect of the invention, there is provided a method of fractionating a biomass material as hereinbefore described wherein the fractionation mix is subjected to a first sonication step, a second sonication step and an autoclave step.

FIG. 6 highlights the cumulative fractionation of each of the three key stages. It is clear to see that all stages have merit in their respective applications. A comparison against the results achieved with sulphuric acid (using an organosolv ratio of 44:32:24 wt. % MIBK:EtOH:H$_2$O) indicates a very similar yield in final pulp mass. This process (with oxalic acid as the catalyst) achieves a greater hemi-cellulose extraction and comparable lignin yields. The cumulative fractionation of each stage for oak with oxalic acid compared to an equivalent experiment with sulphuric acid (SA) is illustrated in FIG. 6.

It will be understood that a variety of organosolv reagents may be suitable for use in the process of the present invention. Such organosolv reagents include those known in the prior art, for example, organosolv reagents are known from our co-pending International patent application PCT/GB2009/002731 and U.S. Pat. No. 5,730,837 which both describe biomass extraction using an organosolv reagent comprising 24% w/w water, 44% w/w methylisobutylketone (MIBK) and 32% w/w ethanol. The organosolv reagent may comprise a ketone, such as an aliphatic ketone. Preferably the ketone is an aliphatic ketone having at least 4 carbon atoms (and may have as many as 10 carbon atoms). Aliphatic ketones which may be mentioned include, for example, methyl ethyl ketone, methyl isopropyl ketone, methyl propyl ketone, methyl butyl ketone, methyl isobutyl ketone, methyl isoamylketone, diethyl ketone, ethyl isopropyl ketone, ethyl propyl ketone, and ethyl isobutyl ketone. A particular ketone which may be mentioned is methyl isobutyl ketone (MIBK).

The alcohol may have less than about 4 carbon atoms to assure that it will be water-miscible. Useful alcohols which may be mentioned include, for example, methanol, ethanol, propanol, isopropanol and butanol. A preferred alcohol is ethanol.

A preferred organosolv reagent is that described in our co-pending application which comprises a ketone, such as, methylisobutylketone (MIBK); an alcohol, such as ethanol; and aqueous oxalic acid.

There is no real benefit in performing a wash after the second sonication stage as trace amounts of released material do not justify the cost of energy and solvents. Table 3 outlines the overall make up of the washing solvent, i.e. organosolv liquor.

TABLE 3

| Inlet material | Overall composition [wt %] |
|---|---|
| Water | 49.78 |
| Oxalic acid | 0.45 |
| MIBK | 33.85 |
| EtOH | 15.92 |

Following fractionation, the organic layer of the organosolv may consist of two phases, i.e. a heavy emulsion lower layer and a lighter ketone (MIBK) upper layer. This may be especially true when the organosolv liquor ratio is ketone (MIBK) dominant resulting in a large light ketone (MIBK) upper layer. The use of about a 16 wt. % ketone (MIBK) content may reduce the chances of this formation. In either case, lignin may be present in both fractions. The lower layer consists predominantly of isolated lignin retained around the ketone (MIBK) whereas the upper layer contains soluble lignin. Both lignin components have been shown to be sulphur free. The soluble lignin has a cost advantage with respect to minimal downstream operations required in recovering it and recycling the ketone (MIBK) back into the process as the soluble lignin is of liquid form and retained within a solely ketone (MIBK) medium. The heavier insoluble lignin emulsion may be preferred on technical grounds with respect to handling lignin. The ketone (MIBK) retained within this lignin component may be recoverable through evaporation or drying of the insoluble lignin. Despite the presence of both types, the heavy insoluble lignin vastly dominates in this process.

Lignin is a complex, cross-linked polymer that forms a large molecular structure and gives mechanical strength to wood by gluing the fibres together (reinforcing agent) between the cell walls. As such, technologies for lignin upgrading are quite immature and progress in (thermo)-chemical upgrading is hampered by technical difficulties such as the complex, heterogeneous nature of the resultant phenolic mixture. Having said this, attractive uses for lignin are:

New wood glues for particle boards, plywood, and other 'zero formaldehyde emission wood based materials Phenolic resin substitutes for plastics and elastomers Reactive, reinforcing phase that can be used to substitute for carbon black in plastic and elastomeric materials New polyurethanes, polyesters et epoxy resins, whose property will be identical or superior to their petrochemical equivalents Uses in gasification or pyrolysis technologies are also possible. In any case, both soluble and insoluble lignins found in this work have potential uses with no expectation that the use of soluble or insoluble lignin will have a dramatic difference in its effectiveness within any of the applications mentioned above.

The aqueous hemi-cellulose fraction is more complex and may be more difficult to purify than either the cellulose or lignin fractions. The hemi-cellulose sugars are mixed with the acid catalyst from the digestion mix as well as traces of other acids, such as, acetic acid, and other organic acids released during the separation process, ethanol and MIBK, as well as very low molecular weight lignin fragments. Simple removal of water to isolate hemi-cellulose sugars from the aqueous fraction may result in decomposition and low material balance due to acid promoted dehydration and condensation reactions. However, chromatographic separation techniques may prove more suitable and benefit solvent recovery and re-use.

In addition to the hemi-cellulose sugars, the aqueous phase may contain large amounts of the acid catalyst. One possible technique for recovery of the acid catalyst, especially if the catalyst is oxalic acid is crystallisation. For example, by reducing the volume of the aqueous fraction, e.g. to say 25 wt. % and cooling the fraction, e.g. to 4° C., approximately 85 wt. % of the originally charged acid catalyst, e.g. oxalic acid, may be crystallized and recovered by filtration with high purity. Chromatographic separation could also be of benefit here also.

Prior to drying, 70-80 wt. % of the mass of pulp (cellulose) is likely to be retained solvent (organosolv). The use of an industrial-scale filter press is likely to decrease this fraction to around 50 wt. %. In any case, the residual pulp may be dried, e.g. in an oven. The pulp contains approximately 70 wt. % and 80 wt. % of cellulose, respectively. The remainder of each are composed of bounded lignin and hemi-cellulose as well as other components, i.e. ash, extractives, etc. NMR indicates a residual content of the output products, i.e. cellulose, hemi-cellulose and lignin. The method of the present invention is capable of achieving a hemi-cellulose purity of ≥80% w/w, or ≥90% w/w.

The invention will now be described by way of example only and with reference to the accompanying figures in which FIG. 1 illustrates the overall method of processing biomass according to the present invention;

EXAMPLE 1

Option 1: Sonicator/Sonicator

The operational parameters per 100 g of biomass for a Sonicator/Sonicator fractionation are illustrated in Table 4.

TABLE 4

| Operational parameters (per 100 g of biomass) | | | | | |
|---|---|---|---|---|---|
| Stage | Equipment | Residence time [mins] | Power [W] | Temperature [° C.] | Pressure [bar] |
| Blending | Blender | 10 | 170 | 70 | atm. |
| $1^{st}$ reaction | Heated stirred tank | 15 | 523 | 70 | atm. |
| | Ultrasound reactor | 45 | 500 | 120-140 | 5 |
| Wash | Ultrasound reactor | 15 | 523 | 70 | atm. |
| $2^{nd}$ reaction | Heated stirred tank | 15 | 523 | 70 | atm. |
| | Ultrasound reactor | 45 | 500 | 120-140 | 5 |

Organic solvents (MIBK and EtOH) are mixed with the output slurry from the blending stage to give a 10 wt. % solid loading slurry. The mixture is stirred and maintained at the outlet temperature from the blender, approximately 70° C. The mixture is de-aerated with an inert gas, such as nitrogen, at this stage. This step allows for the mixture to continue hydrolysing the biomass and extract loose hemi-celluloses and lignin strands into the organosolv liquor. This mixing step takes around 15 mins until the desired temperature is reached. Thereafter the mixture is placed within the ultrasound reactor. However, it will be understood that it is desirable to maintain the H+ concentration, e.g. at 0.1M, even after addition of the other components of the organosolv, e.g. MIBK and EtOH.

The washing stage is undertaken in a stirred tank which is heated to 70° C. for 15 mins.

Figure 1:
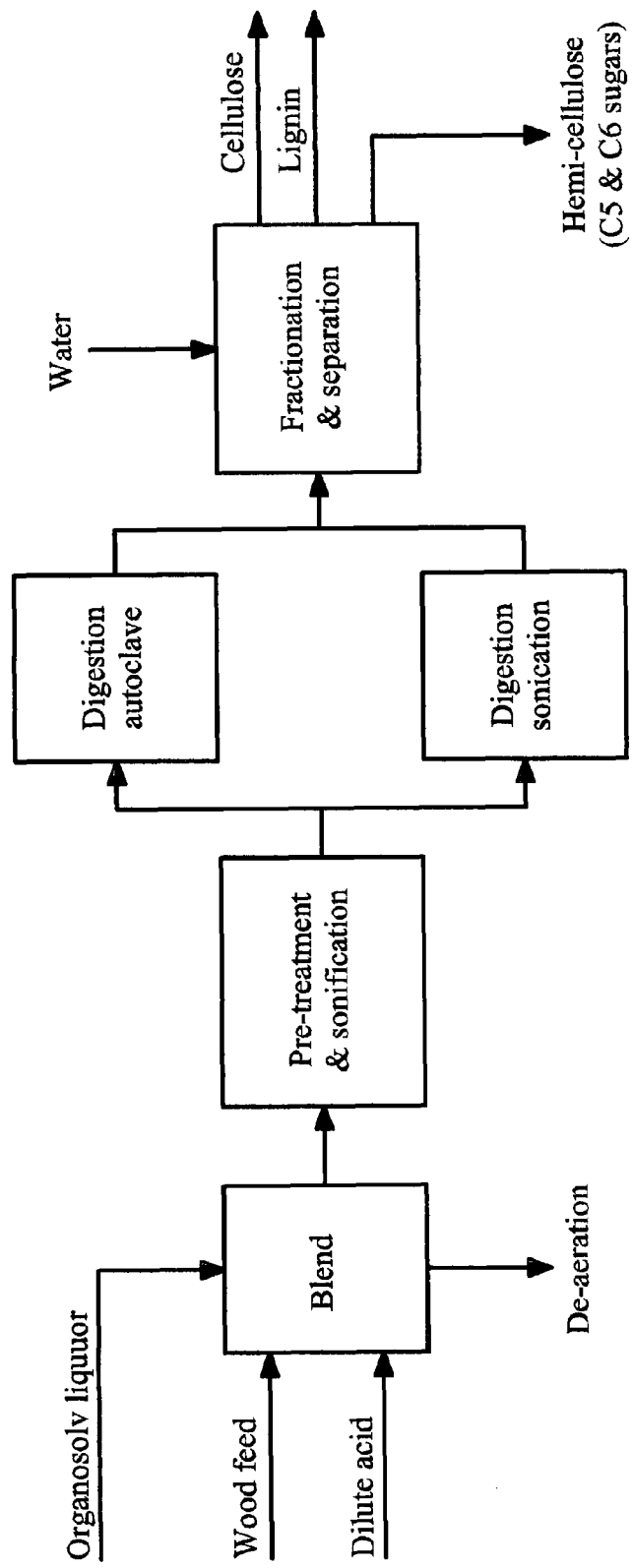
Figure 2:
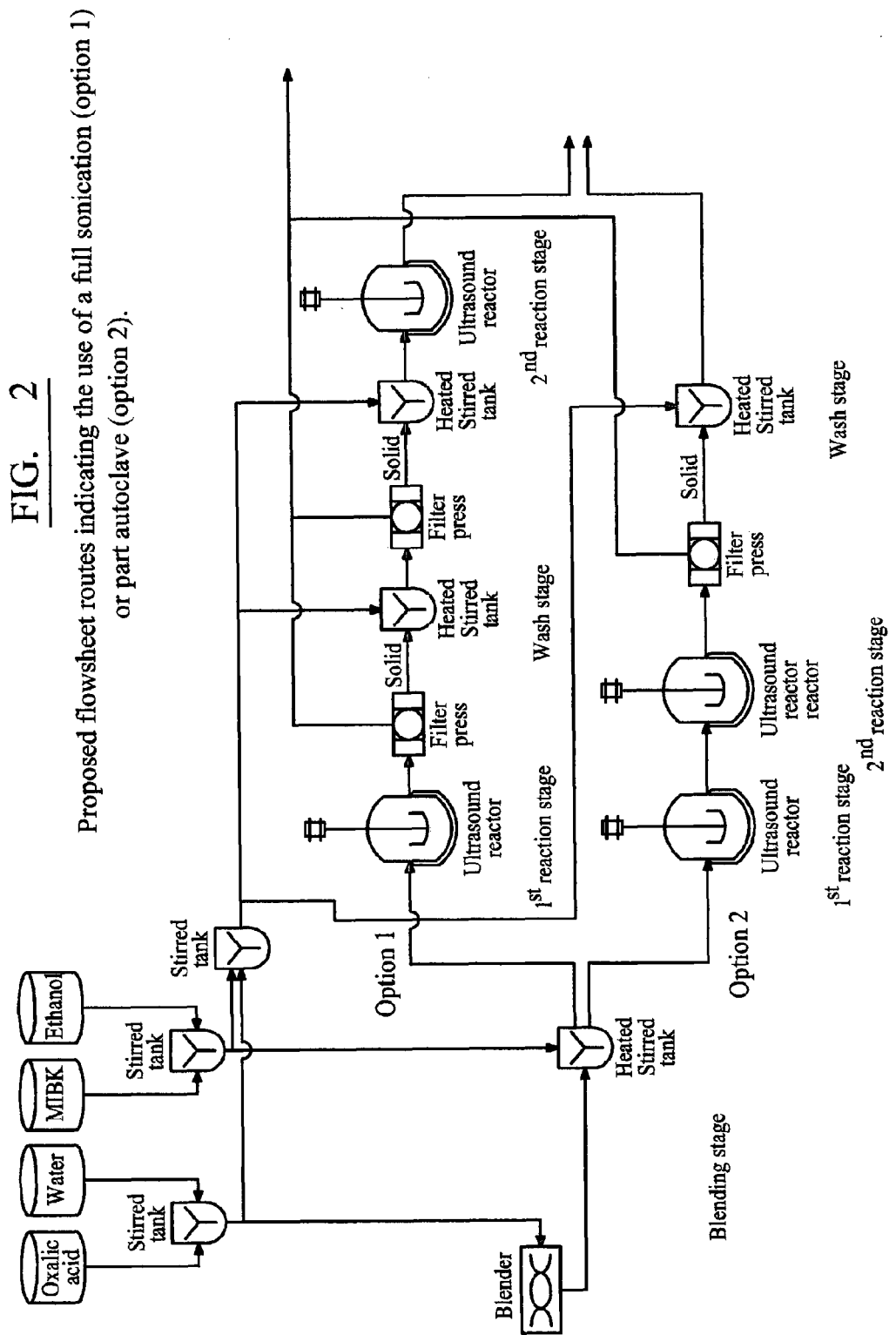
FIG. 2 illustrates the flow sheet routes indicating the use of a full sonication (option 1) or part autoclave (option 2)
Figure 2:
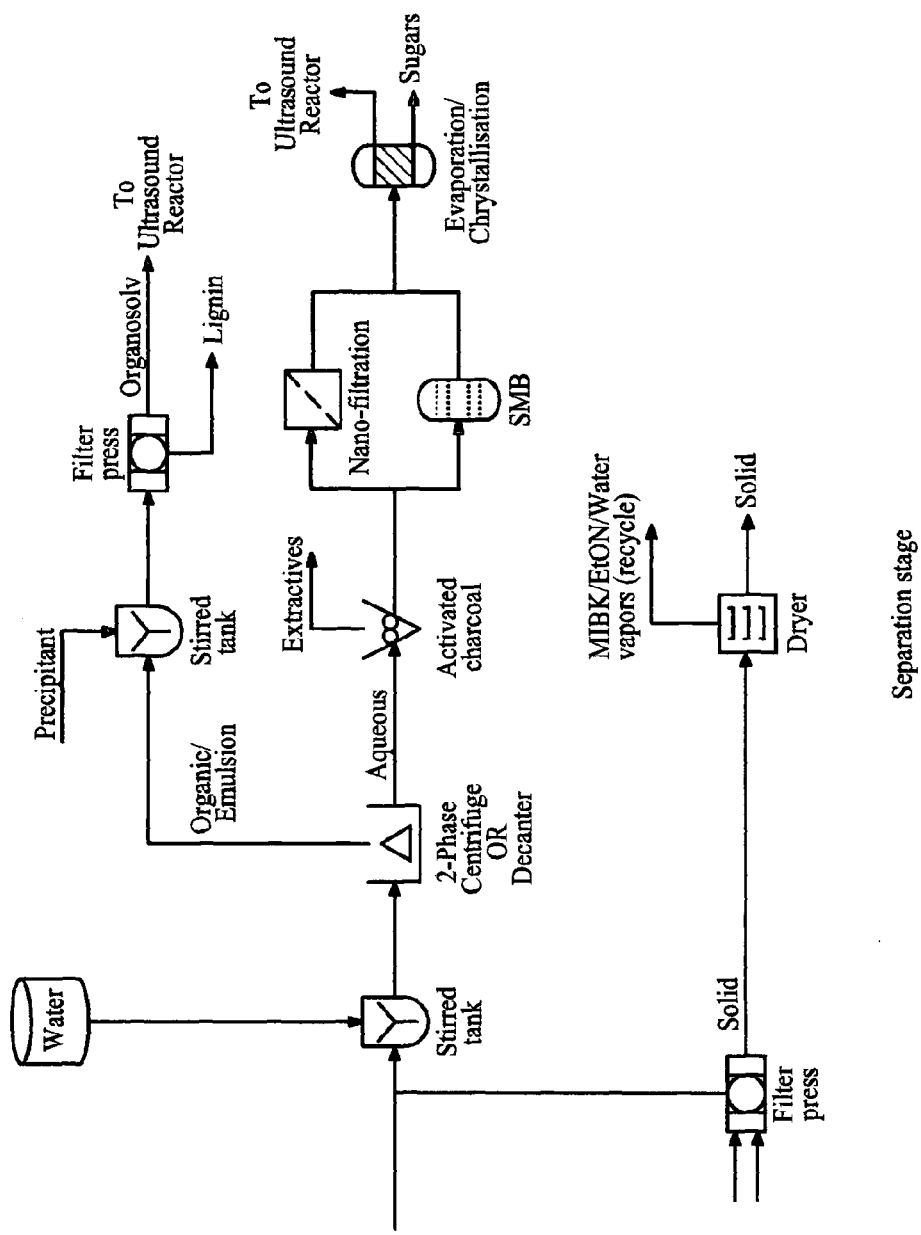
Figure 3:
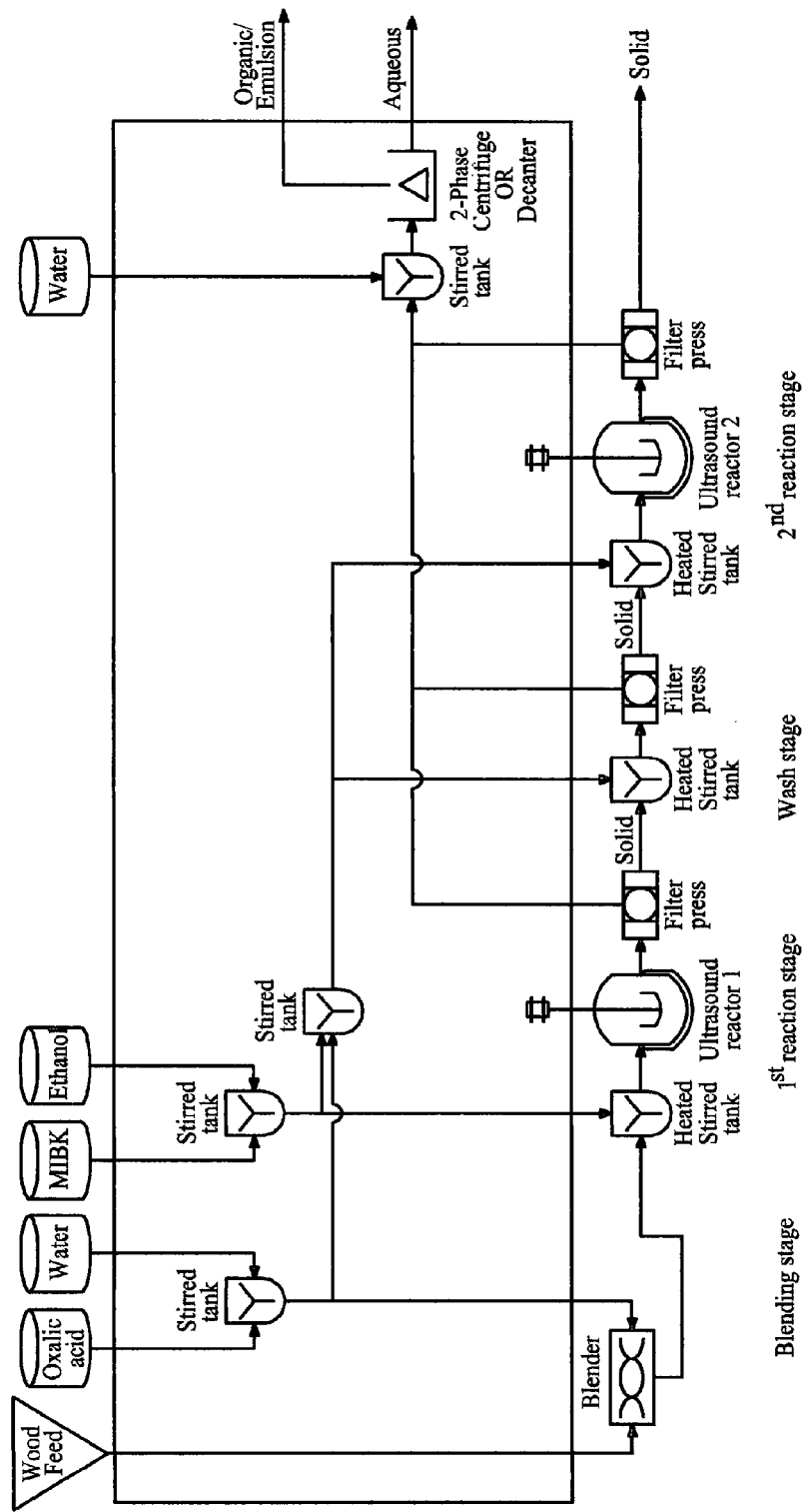
FIG. 3 illustrates the "sonication only" process flow sheet.
Figure 4:
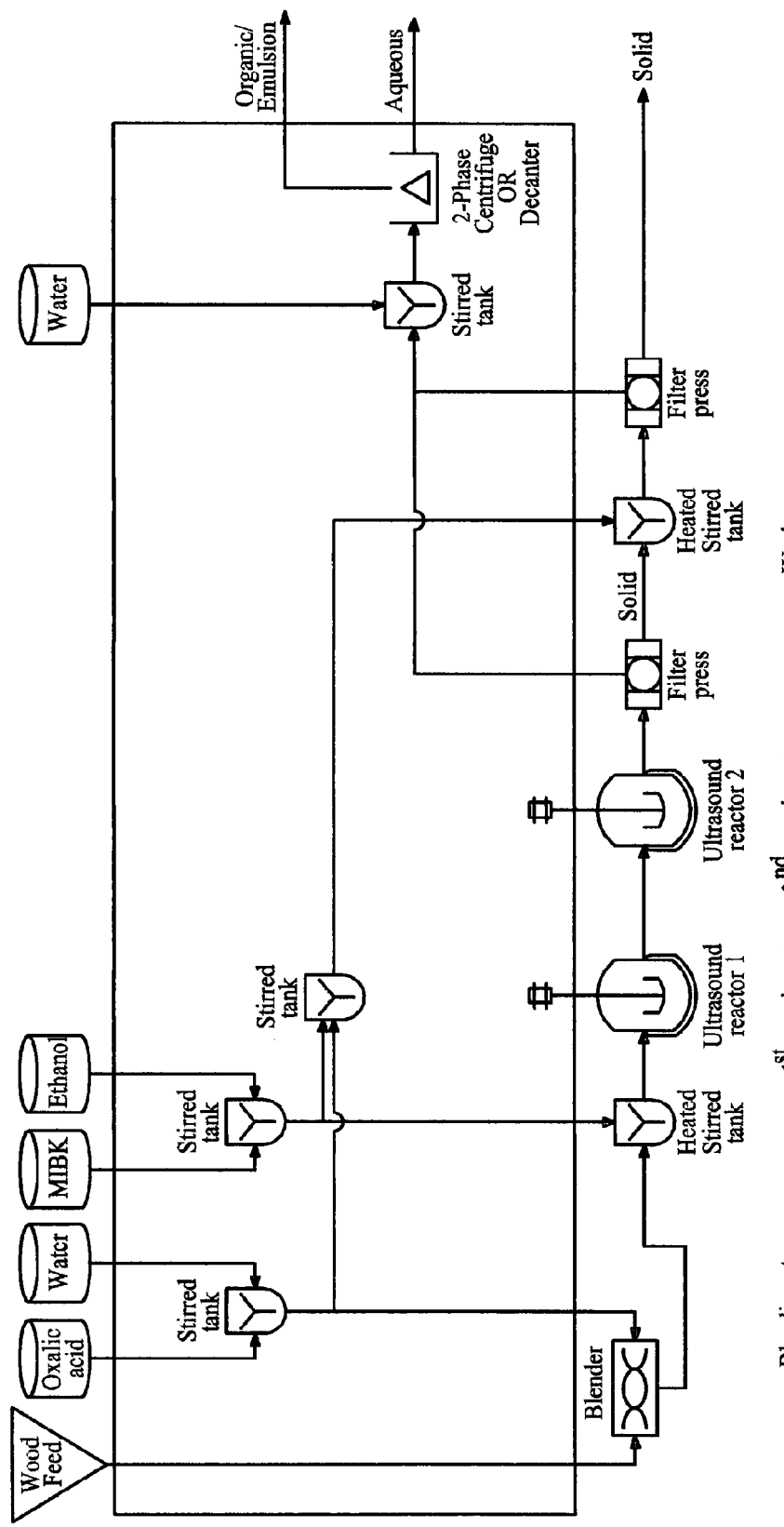
FIG. 4 illustrates the sonicator and autoclave process flow sheet.
Figure 5:
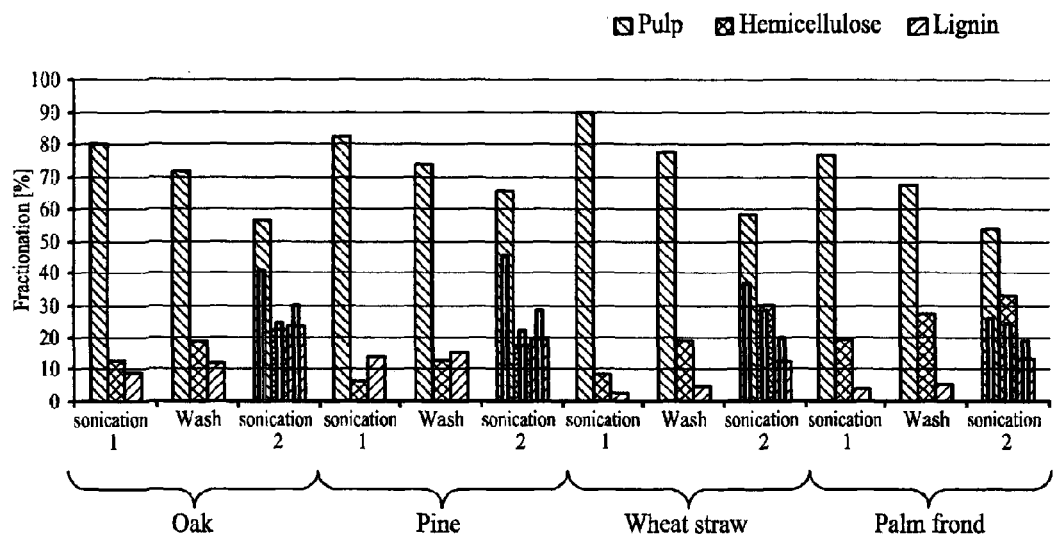
FIG. 5 illustrates the cumulative fractionation of each stage for each feed stock type.
Figure 6:
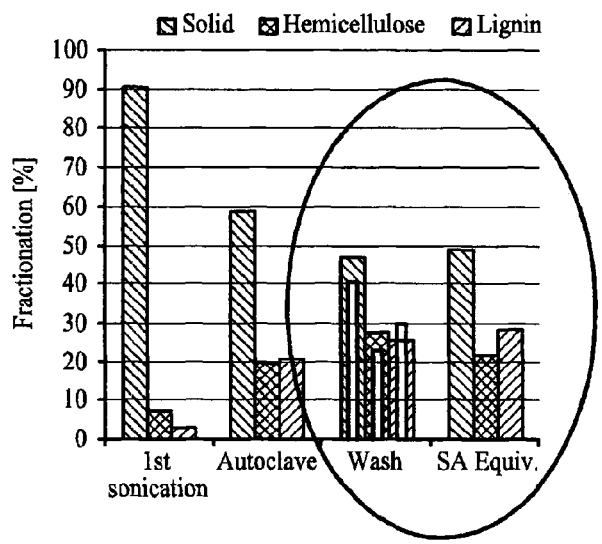
FIG. 6 illustrates the cumulative fractionation of each stage for oak with oxalic acid compared to an equivalent experiment with sulphuric acid.
Figure 7:
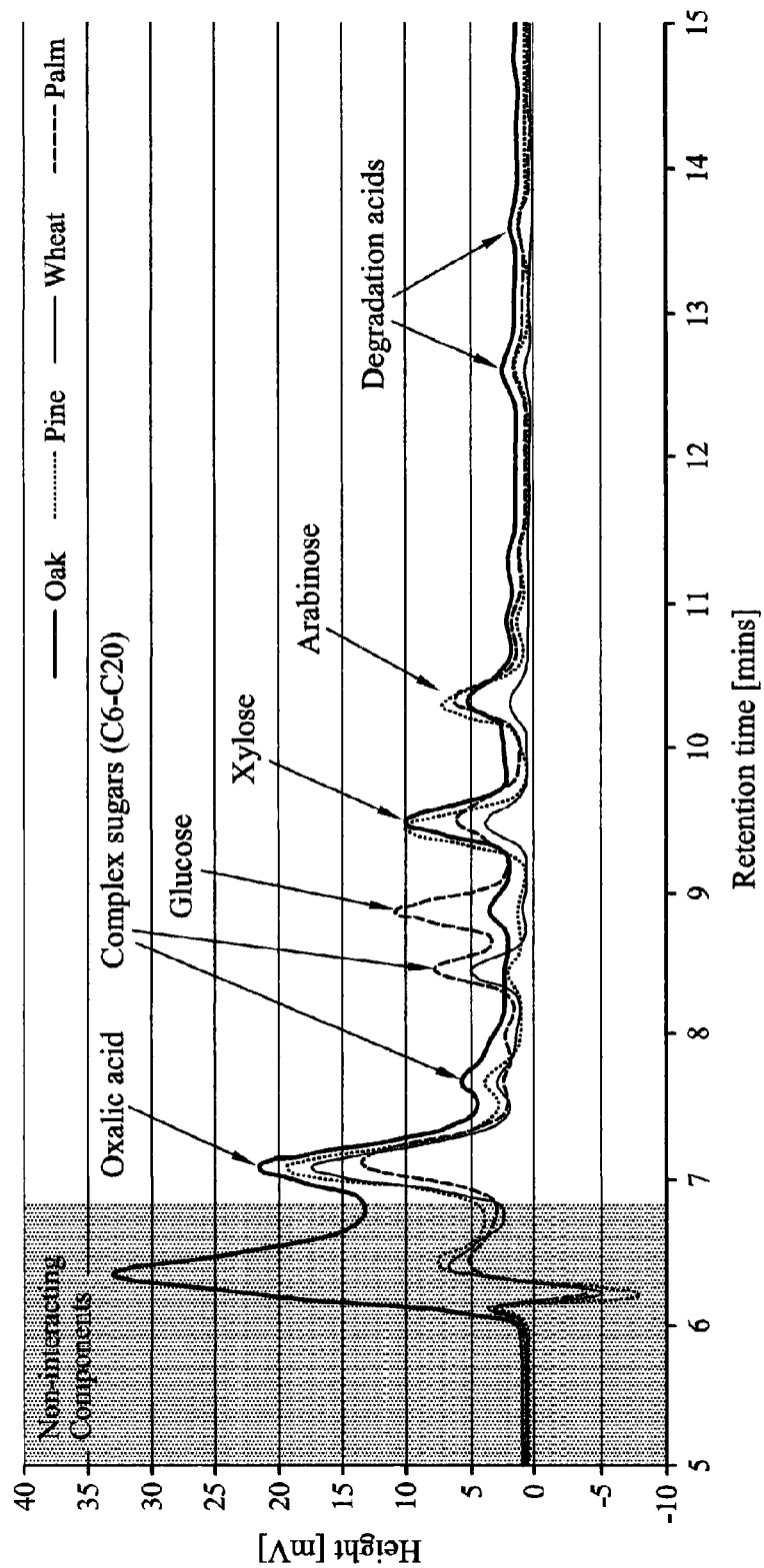
FIG. 7 illustrates the HPLC refractive index chromatograms of aqueous fractions for all feedstocks against a reference hemi-cellulose sample.

Thereafter, a solid-liquid separation ensues to afford on average, a 70% fractionation (see FIG. 7). We found that repeating the sonication stage has a significant effect. The filtered solid is once again added to a 10:1 volume to mass ratio of organosolv liquor, heated to 70° C. and sonicated under a pressure of 5 bar for 45 mins.

Maintaining the power delivered by the ultrasonic transducer at 500 W results in the temperature rising to 120-140° C. A solid-liquid separation indicates that the solid reduces to between 50 to 60% of its original mass (see "$2^{nd}$ sonication" bars in FIG. 7).

Lignocellulosic biomass releases higher fractions of lignin than that of grassy biomass. Conversely, grassy biomass releases greater concentrations of hemi-celluloses than their woody counterparts. Pulp from a) trees; and b) grass; are both lignocellulosic but in general tree sourced pulp has a higher lignin component compared to grassy sourced pulp.

Figure 9:
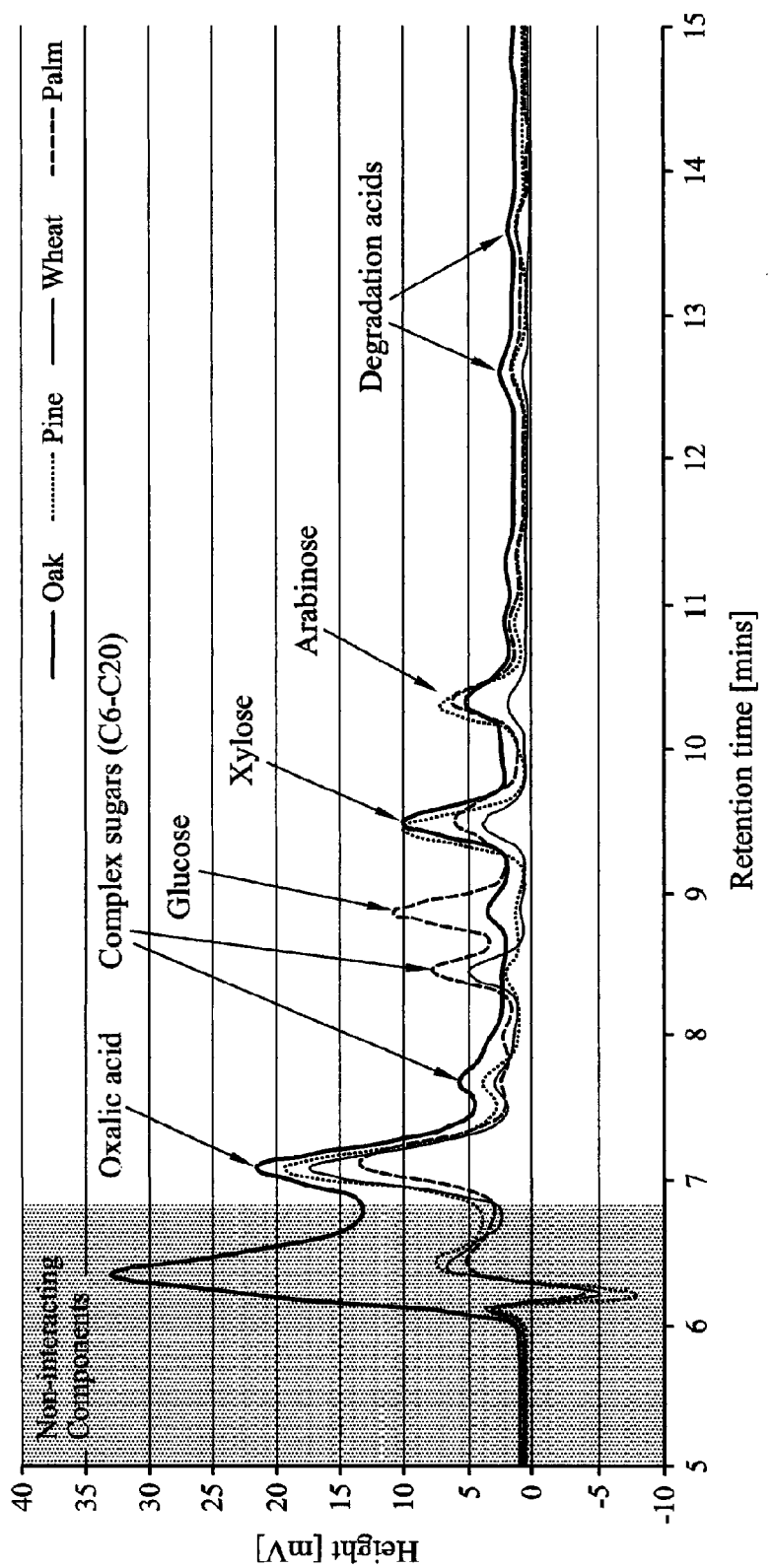
FIG. 9 illustrates the HPLC refractive index chromatograms of aqueous fractions for all feedstocks against a reference hemi-cellulose sample.

As seen above, option extracted around 70% of the bounded hemi-cellulose and lignin from the cellulose. All or most of the bounded material is extractable, i.e. by performing an autoclave step on the dual sonicated material. That is, "Sonication 2" solid (as seen in FIG. 9) of each feedstock has been dried and subjected to further digestion in an autoclave. As performed in option two, 150 ml of organosolv liquor (see Table 5) is added to 15 g of solid, and vacuum sealed within a stainless-steel autoclave under similar conditions to that indicated above.

EXAMPLE 2

Option 2: Sonicator with Autoclave

Studies performed by Lapkin (A. Lapkin, Validation of the initial method of solvent fractionation of ligno-cellulose—Final Report; Chemical Engineering Dept., Bath University: 2008) and Bozell et al. (Joseph Bozell, Stuart Black, Michele Myers, Deborah Cahill, Paul Miller, Sunkyu Park, Biomass and Bioenergy, 35 (2011) 4197-4208), utilise an autoclave to great effect. Initially to gain a benchmark of the system's capabilities, studies were performed that mimicked that of Lapkin's work. An input mass of 15 g of dried oak was added to 150 ml of organosolv liquor (44 wt. % MIBK, 32 wt. % EtOH, 24 wt. % H2O) and 0.05 M of sulphuric acid. The contents were then vacuum sealed within a stainless-steel autoclave with the temperature increased to 140° C. As the boiling point of the solvents is passed, the eventual pressure of system reaches ~6 bar. The experiment was conducted for 60 mins. This yielded a 43.19 wt. % reduction in the output solid fraction with 23.8 wt. % and 19.39 wt. % of extraction residing in the aqueous and organic layers.

EXAMPLE 3

2-Stage Sonication

The breakdown of material retained within each fraction, i.e. pulp, aqueous and organic, from each operation, i.e. first run, wash and second run was analysed by subjecting the aqueous samples to high performance liquid chromatography (HPLC) analysis. Sugars and degradation products were determined and where possible quantified with a refractive index detector that had been calibrated to identify carbohydrates. FIG. 7 shows typical chromatograms from the above 2-stage sonication process for oak, pine, wheat straw and palm frond against a reference hemi-cellulose sample for wheat straw (see FIG. 10(b)). The low concentrations of degradation products are notable. And consistent peaks of the expected sugars are observed and only trace amounts of degradation products (this is not intended to be a quantitative analysis).

The HPLC refractive index chromatograms of aqueous fractions for all feedstocks against a reference hemi-cellulose sample are illustrated in FIG. 7.

EXAMPLE 4

Light and Heavy Organic Fractions

Analyses of both light and heavy organic fractions from various samples were performed in a size exclusion column (SEC), with NMP (N-Methyl-2-pyrrolidone) as the eluent. Within an SEC column, bonding electrons absorb radiation of specific wavelengths in the range of 190-800 nm, and according to the following citation (www.wiley-vch.de/books/biopoly/pdf/v01_kap03.pdf), lignin is detectable around 280 nm. FIGS. 8(a) and (b) highlight that complex 3D structures are realised at 300 nm, and thus significantly confirm the presence of lignin. FIGS. 8(a) and 8(b), light (soluble) and heavy (insoluble) analyses respectively, shows there seems to be two main lignin structures within the oak samples, e.g. at peaks 300,000 g/mol and 1,000-3,000 g/mol. There is also a third peak of around 150 g/mol, which suggests that of the solvent MIBK retained within the fractions. This figure is primarily included to qualitatively indicate both organic fractions indicate monomeric building units of lignin (as compared with those found in miscanthus (not shown)). As expected, the soluble lignin in the light layer is of high quality giving distinctive and consistent peaks. Such lignins have reactivity functional groups and interesting colloid chemical properties. The heavier insoluble lignin however is greater in quantity but more sporadic and of lower quality.

Figure 8:
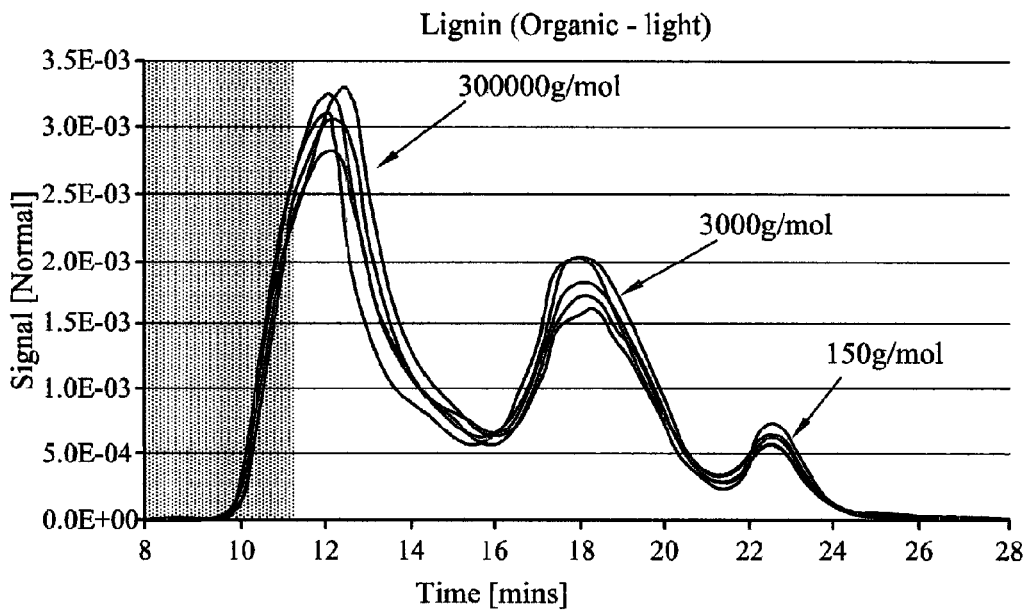
FIG. 8 illustrates the SEC chromatograms of organic (a) light and (b) heavy fractions.
Figure 8:
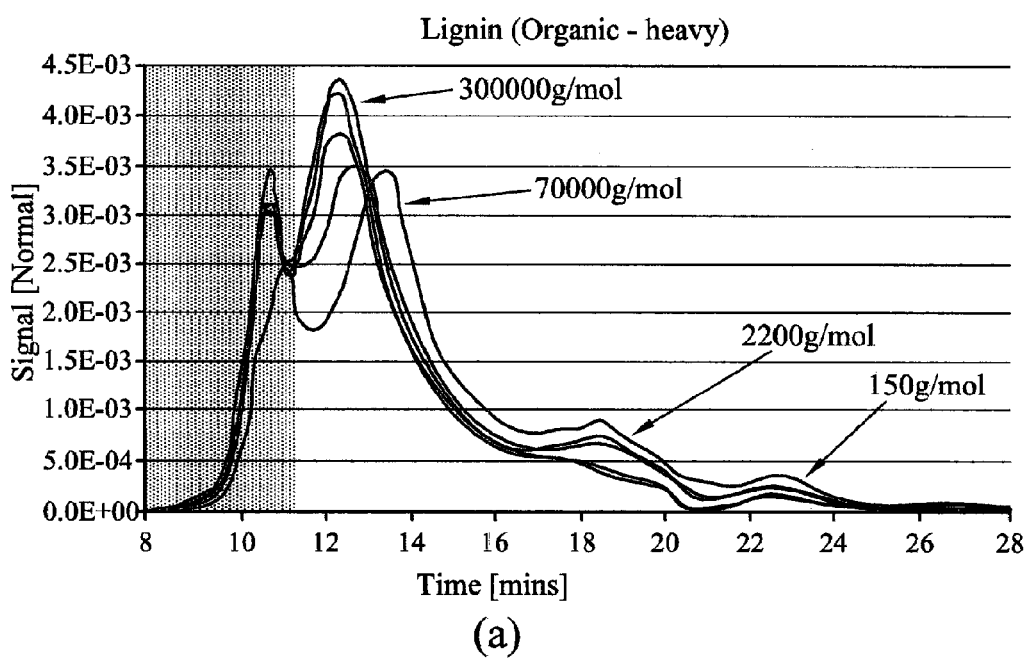

The SEC chromatograms of organic (a) light and (b) heavy fractions are illustrated in FIG. 8.

EXAMPLE 5

Sugar Concentrations of the Hemi-Cellulose Fractionation

Figure 10:
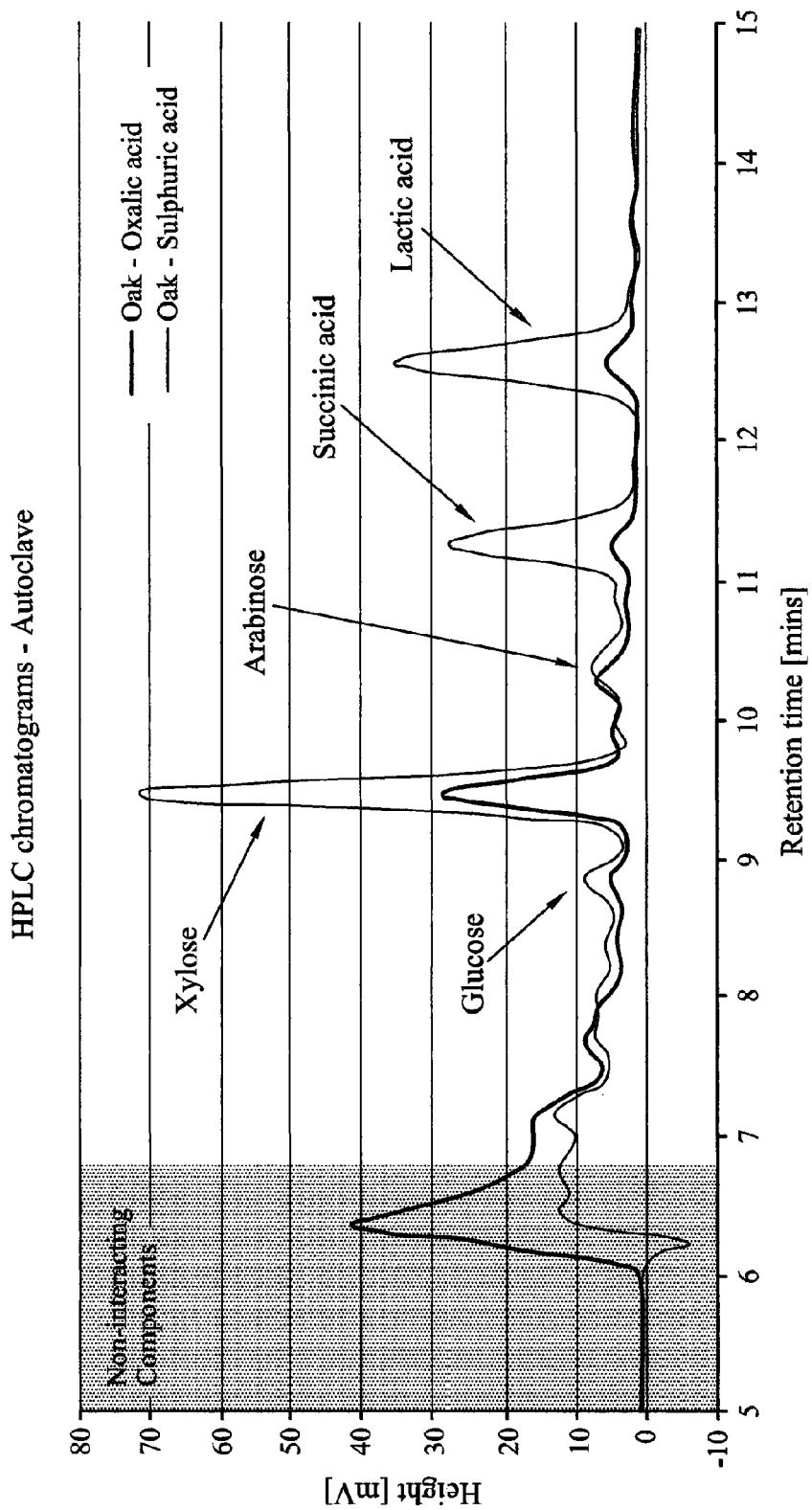
FIG. 10 illustrates the HPLC refractive index chromatograms of aqueous fractions.

Regarding the hemi-cellulose within the aqueous fraction, the ethanol was evaporated off to yield a concentrated rich solution. Samples were taken and subjected to HPLC analysis for approximate sugar concentrations (as seen in chromatogram of FIGS. 9 and 10).

Wherein the HPLC refractive index chromatograms of aqueous fractions for all feedstocks against a reference hemi-cellulose sample is illustrated in FIG. 9; and the HPLC refractive index chromatograms of aqueous fractions are illustrated in FIG. 10.

The invention claimed is:

1. A method of fractionating a biomass material comprising the steps of:
   (i) blending the biomass material with an organic acid catalyst having a pKa of less than 5, and an organosolv reagent under an inert atmosphere to form a pre-treatment mix as a slurry, wherein the organosolv reagent comprises a ketone, an alcohol and water;
   (ii) subjecting the pre-treatment mix to sonication to produce a fractionation mix comprising solid and liquid components;
   (iii) optionally heating the sonicated pre-treatment mix in an autoclave under pressure;
   (iv) separating the solid and liquid components of the fractionation mix;
   (v) optionally washing the solid component;
   (vi) optionally drying the solid component;
   (vii) separating the liquid component into organic and aqueous components by evaporating the alcohol to trigger phase separation; and
   (viii) isolating lignin from the organic component and/or isolating hemi-cellulose from the aqueous component.

2. The method according to claim 1further comprising the step of de-aerating the organosolv reagent before the blending step.

3. The method according to claim 1 wherein the step of heating the sonicated pre-treatment mix in an autoclave under pressure is compulsory.

4. The method according to claim 1 wherein said acid catalyst is an aqueous organic acid.

5. The method according to claim 1 wherein said acid catalyst is an aqueous oxalic acid.

6. The method according to claim 1 wherein the biomass material is comminuted to a mean particle size of from about 0.5 mm to about 10 mm prior to blending.

7. The method according to claim 1 wherein the biomass material is dried prior to blending.

8. The method according to claim 1 wherein the water content in the slurry is from about 30 to about 60 wt. %.

9. The method according to claim 1 wherein the sonication step is carried out with a sonicator operating at a frequency in the range of from about 10 to about 250 kHz.

10. The method according to claim 1 wherein the sonication step is carried out with a sonicator operating at an energy output of from about 50 W to about 400 W.

11. The method according to claim 1 wherein the sonication step is carried out with a sonicator comprising a three-dimensional arrangement of a plurality of transducers.

12. The method according to claim 1 wherein the pressure in the autoclave is from abou 5 bar to about 20 bar.

13. The method according to claim 1 wherein the organosolv reagent comprises a ketone; an alcohol; and aqueous oxalic acid.

14. The method according to claim 13 wherein the ketone is methylisobutylketone.

15. The method according to claim 13 wherein the alcohol is ethanol.

16. The method according to claim 1 wherein the lignin is recovered by isolating the organosolv reagent wherein said organosolv reagent comprises a ketone; an alcohol; and aqueous oxalic acid; and evaporating the ketone after fractionation.

17. The method according to claim 1 wherein the hemicellulose is recovered from the organosolv reagent, wherein said organosolv reagent comprises a ketone; an alcohol; and aqueous oxalic acid, by isolating the alcohol of the organosolv reagent after fractionation and subjecting it to chromatographic separation.

18. The method according to claim 17 wherein the alcohol is present as a mixture of alcohol and water.

19. The method according to claim 1 wherein the acid catalyst is recovered from the organosolv reagent; wherein said organosolv reagent comprises a ketone; an alcohol; and aqueous oxalic acid, and the acid catalyst is recovered by crystallisation from the aqueous portion of the organosolv reagent.

20. The method according to claim 19 wherein the aqueous portion is present as a mixture of water and alcohol.

* * * * *